(12) United States Patent
England et al.

(10) Patent No.: US 12,405,833 B2
(45) Date of Patent: Sep. 2, 2025

(54) SYSTEM FOR IMPLEMENTING DYNAMIC AUTHENTICATION RESTRICTIONS FOR RESOURCE INSTRUMENT USE

(71) Applicant: BANK OF AMERICA CORPORATION, Charlotte, NC (US)

(72) Inventors: Tony England, Tega Cay, SC (US); Steven Michael Twombly, Saco, ME (US); Robertson Walters Greenbacker, Charlotte, NC (US); Bradley Ryan Holland, Huntersville, NC (US); Sara A. Walsh, West Chester, PA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 667 days.

(21) Appl. No.: 17/743,120

(22) Filed: May 12, 2022

(65) Prior Publication Data

US 2023/0367645 A1 Nov. 16, 2023

(51) Int. Cl.
*G06F 9/50* (2006.01)

(52) U.S. Cl.
CPC ............ *G06F 9/5072* (2013.01); *G06F 9/505* (2013.01); *G06F 9/5083* (2013.01)

(58) Field of Classification Search
CPC ... G06F 1/329; G06F 9/46; G06F 9/48; G06F 9/4806; G06F 9/4837; G06F 9/5005
See application file for complete search history.

(56) References Cited

U.S. PATENT DOCUMENTS

| | | |
|---|---|---|
| 8,117,314 B2 | 2/2012 | Croft et al. |
| 8,380,630 B2 | 2/2013 | Felsher |
| 8,495,244 B2 | 7/2013 | Bonar et al. |
| 8,726,343 B1 | 5/2014 | Borzycki et al. |
| 9,027,125 B2 | 5/2015 | Kumar |
| 9,380,062 B2 | 6/2016 | Burch et al. |
| 9,419,951 B1 | 8/2016 | Felsher et al. |
| 9,432,350 B2 | 8/2016 | Anderson et al. |
| 9,686,287 B2 | 6/2017 | Manton et al. |
| 10,225,157 B2 | 3/2019 | Cordray et al. |
| 10,290,133 B2 | 5/2019 | Straub |
| 10,382,595 B2 | 8/2019 | Tola, Jr. |
| 10,630,501 B2 | 4/2020 | Ansari et al. |
| 10,872,333 B2 | 12/2020 | Dua |
| 11,334,894 B1* | 5/2022 | Kramme ................ G06Q 20/34 |
| 11,663,580 B2* | 5/2023 | Gupta ............... G06Q 20/3415 |
| | | 705/41 |

(Continued)

*Primary Examiner* — Andy Ho
(74) *Attorney, Agent, or Firm* — Moore & Van Allen PLLC; Nicholas C. Russell

(57) ABSTRACT

A system is provided for implementing dynamic authentication restrictions for resource instrument use. In particular, the system may be configured to implement a spectrum of resource transfer restrictions on a device level, resource transfer instrument level, and/or resource transfer type level, where the restrictions may be implemented based on user input and/or automatically through machine learning processes. In some embodiments, the system may implement dynamic resource restrictions per resource transfer based on a trained machine learning model. In this way, the system may provide an efficient and secure way to implement resource transfer restrictions.

20 Claims, 5 Drawing Sheets

(56) References Cited

U.S. PATENT DOCUMENTS

| | | | |
|---|---|---|---|
| 2013/0117155 A1* | 5/2013 | Glasgo | G06Q 20/4015 |
| | | | 705/26.35 |
| 2016/0364553 A1 | 12/2016 | Smith et al. | |
| 2018/0013747 A1 | 1/2018 | Marshall et al. | |
| 2018/0115551 A1 | 4/2018 | Cole | |
| 2018/0176318 A1 | 6/2018 | Rathod | |
| 2018/0343238 A1 | 11/2018 | Tola | |
| 2020/0389469 A1 | 12/2020 | Litichever et al. | |
| 2021/0326467 A1 | 10/2021 | Levy et al. | |

* cited by examiner

SYSTEM FOR IMPLEMENTING DYNAMIC AUTHENTICATION RESTRICTIONS FOR RESOURCE INSTRUMENT USE

FIELD OF THE INVENTION

The present invention embraces a system for implementing dynamic authentication restrictions for resource instrument use.

BACKGROUND

There is a need for a secure way to implement authentication restrictions for resource instruments.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

A system is provided for implementing dynamic authentication restrictions for resource instrument use. In particular, the system may be configured to implement a spectrum of resource transfer restrictions on a device level, resource transfer instrument level, and/or resource transfer type level, where the restrictions may be implemented based on user input and/or automatically through machine learning processes. In some embodiments, the system may implement dynamic resource restrictions per resource transfer based on a trained machine learning model. In this way, the system may provide an efficient and secure way to implement resource transfer restrictions.

A system is also provided for intelligent type-based implementation of restrictions on resource transfers. In this regard, the system may allow for resource transfers set according to a preset resource transfer pattern to be executed while restricting net new resource transfers upon compromise of the resource transfer instrument. Subsequently, the system may use a machine learning model to analyze the attributes of incoming resource transfer requests and determine whether the resource transfer should be allowed or restricted based on the preset resource transfer pattern. In this way, the system may provide a way to fine-tune restrictions on executing resource transfers.

Accordingly, embodiments of the present disclosure provide a system for implementing dynamic authentication restrictions for resource instrument use, the system comprising at least one non-transitory storage device; and at least one processor coupled to the at least one non-transitory storage device, wherein the at least one processor is configured to continuously monitor attributes associated with incoming resource transfer requests; receive, from an endpoint device, one or more inputs associated with a compromise of a first resource transfer instrument; receive a subsequent resource transfer request; based on one or more attributes associated with the subsequent resource transfer request and the one or more inputs associated with the compromise of the first resource transfer instrument, generate a resource transfer restriction pattern using a machine learning model; and execute one or more restrictions on the subsequent resource transfer request according to the resource transfer restriction pattern.

In some embodiments, the at least one processor is further configured to detect that the subsequent resource transfer request is associated with the first resource transfer instrument, wherein executing the one or more restrictions according to the resource transfer restriction pattern comprises blocking the subsequent resource transfer request while allowing resource transfer requests associated with a second resource transfer instrument.

In some embodiments, the at least one processor is further configured to detect that the subsequent resource transfer request is associated with a second resource transfer instrument, wherein executing the one or more restrictions according to the resource transfer restriction pattern comprises allowing the subsequent resource transfer request.

In some embodiments, continuously monitoring the attributes associated with incoming resource transfer requests comprises monitoring at least one of resource transfer amounts, endpoint information, and resource transfer times.

In some embodiments, the one or more inputs from the endpoint device comprise an indication that the first resource transfer instrument has been misplaced, wherein the one or more inputs further comprise a location of the first resource transfer instrument.

In some embodiments, the at least one processor is further configured to transmit one or more queries to the endpoint device associated with the one or more inputs associated with the compromise of the first resource transfer instrument.

In some embodiments, the one or more inputs from the endpoint device indicates that the first resource transfer instrument has been used by an unauthorized user.

Embodiments of the present disclosure also provide a computer program product for implementing dynamic authentication restrictions for resource instrument use, the computer program product comprising a non-transitory computer-readable medium comprising code causing an apparatus to continuously monitor attributes associated with incoming resource transfer requests; receive, from an endpoint device, one or more inputs associated with a compromise of a first resource transfer instrument; receive a subsequent resource transfer request; based on one or more attributes associated with the subsequent resource transfer request and the one or more inputs associated with the compromise of the first resource transfer instrument, generate a resource transfer restriction pattern using a machine learning model; and execute one or more restrictions on the subsequent resource transfer request according to the resource transfer restriction pattern.

In some embodiments, the apparatus is further configured to detect that the subsequent resource transfer request is associated with the first resource transfer instrument, wherein executing the one or more restrictions according to the resource transfer restriction pattern comprises blocking the subsequent resource transfer request while allowing resource transfer requests associated with a second resource transfer instrument.

In some embodiments, the apparatus is further configured to detect that the subsequent resource transfer request is associated with a second resource transfer instrument, wherein executing the one or more restrictions according to the resource transfer restriction pattern comprises allowing the subsequent resource transfer request.

In some embodiments, continuously monitoring the attributes associated with incoming resource transfer requests comprises monitoring at least one of resource transfer amounts, endpoint information, and resource transfer times.

In some embodiments, the one or more inputs from the endpoint device comprise an indication that the first resource transfer instrument has been misplaced, wherein the one or more inputs further comprise a location of the first resource transfer instrument.

In some embodiments, the apparatus is further configured to transmit one or more queries to the endpoint device associated with the one or more inputs associated with the compromise of the first resource transfer instrument.

Embodiments of the present disclosure also provide a method for implementing dynamic authentication restrictions for resource instrument use, the method comprising continuously monitoring attributes associated with incoming resource transfer requests; receiving, from an endpoint device, one or more inputs associated with a compromise of a first resource transfer instrument; receiving a subsequent resource transfer request; based on one or more attributes associated with the subsequent resource transfer request and the one or more inputs associated with the compromise of the first resource transfer instrument, generating a resource transfer restriction pattern using a machine learning model; and executing one or more restrictions on the subsequent resource transfer request according to the resource transfer restriction pattern.

In some embodiments, the method further comprises detecting that the subsequent resource transfer request is associated with the first resource transfer instrument, wherein executing the one or more restrictions according to the resource transfer restriction pattern comprises blocking the subsequent resource transfer request while allowing resource transfer requests associated with a second resource transfer instrument.

In some embodiments, the method further comprises detecting that the subsequent resource transfer request is associated with a second resource transfer instrument, wherein executing the one or more restrictions according to the resource transfer restriction pattern comprises allowing the subsequent resource transfer request.

In some embodiments, continuously monitoring the attributes associated with incoming resource transfer requests comprises monitoring at least one of resource transfer amounts, endpoint information, and resource transfer times.

In some embodiments, the one or more inputs from the endpoint device comprise an indication that the first resource transfer instrument has been misplaced, wherein the one or more inputs further comprise a location of the first resource transfer instrument.

In some embodiments, the method further comprises transmitting one or more queries to the endpoint device associated with the one or more inputs associated with the compromise of the first resource transfer instrument.

In some embodiments, the one or more inputs from the endpoint device indicates that the first resource transfer instrument has been used by an unauthorized user.

Embodiments of the present disclosure also provide a system for intelligent type-based implementation of restrictions on resource transfers, the system comprising at least one non-transitory storage device; and at least one processor coupled to the at least one non-transitory storage device, wherein the at least one processor is configured to continuously monitor attributes associated with incoming resource transfer requests; receive, from an endpoint device, one or more inputs associated with a compromise of a resource transfer instrument; receive, subsequently to the one or more inputs, a resource transfer request associated with the resource transfer instrument; based on one or more attributes associated with the resource transfer request, determine a type of resource transfer associated with the resource transfer request; based on the type of resource transfer, generate a resource transfer restriction pattern using a machine learning model; and execute one or more restrictions on the resource transfer request according to the resource transfer restriction pattern.

In some embodiments, determining the type of resource transfer associated with the resource transfer request comprises detecting, based on at least one of a resource transfer amount, transfer time and date, and recipient information, that the resource transfer request is associated with a recurring resource transfer; and wherein executing the one or more restrictions on the resource transfer request according to the resource transfer restriction pattern comprises allowing the recurring resource transfer to be executed.

In some embodiments, determining the type of resource transfer associated with the resource transfer request comprises detecting that the resource transfer request is associated with an expected resource transfer; and wherein executing the one or more restrictions on the resource transfer request according to the resource transfer restriction pattern comprises allowing the expected resource transfer to be executed.

In some embodiments, determining the type of resource transfer associated with the resource transfer request comprises detecting, based on at least one of a resource transfer amount, recipient information, and location information associated with the resource transfer request, that the resource transfer request is associated with an unauthorized resource transfer; and wherein executing the one or more restrictions on the resource transfer request according to the resource transfer restriction pattern comprises blocking the unauthorized resource transfer from being executed.

In some embodiments, the resource transfer restriction pattern comprises allowing recurring resource transfers to be executed while blocking unauthorized resource transfers from being executed.

In some embodiments, the at least one processor is further configured to transmit a notification to the endpoint device, wherein the notification comprises a prompt to confirm whether the resource transfer request is authorized; receive a response from the endpoint device that the resource transfer request is unauthorized; and based on the response, block the resource transfer request.

In some embodiments, the at least one processor is further configured to transmit a notification to the endpoint device, wherein the notification comprises a prompt to provide additional authentication credentials.

Embodiments of the present disclosure also provide a computer program product for intelligent type-based implementation of restrictions on resource transfers, the computer program product comprising a non-transitory computer-readable medium comprising code causing an apparatus to continuously monitor attributes associated with incoming resource transfer requests; receive, from an endpoint device, one or more inputs associated with a compromise of a resource transfer instrument; receive, subsequently to the one or more inputs, a resource transfer request associated with the resource transfer instrument; based on one or more attributes associated with the resource transfer request, determine a type of resource transfer associated with the resource transfer request; based on the type of resource transfer, generate a resource transfer restriction pattern using a machine learning model; and execute one or more restrictions on the resource transfer request according to the resource transfer restriction pattern.

In some embodiments, determining the type of resource transfer associated with the resource transfer request comprises detecting, based on at least one of a resource transfer amount, transfer time and date, and recipient information, that the resource transfer request is associated with a recurring resource transfer; and wherein executing the one or more restrictions on the resource transfer request according to the resource transfer restriction pattern comprises allowing the recurring resource transfer to be executed.

In some embodiments, determining the type of resource transfer associated with the resource transfer request comprises detecting that the resource transfer request is associated with an expected resource transfer; and wherein executing the one or more restrictions on the resource transfer request according to the resource transfer restriction pattern comprises allowing the expected resource transfer to be executed.

In some embodiments, determining the type of resource transfer associated with the resource transfer request comprises detecting, based on at least one of a resource transfer amount, recipient information, and location information associated with the resource transfer request, that the resource transfer request is associated with an unauthorized resource transfer; and wherein executing the one or more restrictions on the resource transfer request according to the resource transfer restriction pattern comprises blocking the unauthorized resource transfer from being executed.

In some embodiments, the resource transfer restriction pattern comprises allowing recurring resource transfers to be executed while blocking unauthorized resource transfers from being executed.

In some embodiments, the apparatus is further configured to transmit a notification to the endpoint device, wherein the notification comprises a prompt to confirm whether the resource transfer request is authorized; receive a response from the endpoint device that the resource transfer request is unauthorized; and based on the response, block the resource transfer request.

Embodiments of the present disclosure also provide a method for intelligent type-based implementation of restrictions on resource transfers, the method comprising continuously monitoring attributes associated with incoming resource transfer requests; receiving, from an endpoint device, one or more inputs associated with a compromise of a resource transfer instrument; receiving, subsequently to the one or more inputs, a resource transfer request associated with the resource transfer instrument; based on one or more attributes associated with the resource transfer request, determining a type of resource transfer associated with the resource transfer request; based on the type of resource transfer, generating a resource transfer restriction pattern using a machine learning model; and executing one or more restrictions on the resource transfer request according to the resource transfer restriction pattern.

In some embodiments, determining the type of resource transfer associated with the resource transfer request comprises detecting, based on at least one of a resource transfer amount, transfer time and date, and recipient information, that the resource transfer request is associated with a recurring resource transfer; and wherein executing the one or more restrictions on the resource transfer request according to the resource transfer restriction pattern comprises allowing the recurring resource transfer to be executed.

In some embodiments, determining the type of resource transfer associated with the resource transfer request comprises detecting that the resource transfer request is associated with an expected resource transfer; and wherein executing the one or more restrictions on the resource transfer request according to the resource transfer restriction pattern comprises allowing the expected resource transfer to be executed.

In some embodiments, determining the type of resource transfer associated with the resource transfer request comprises detecting, based on at least one of a resource transfer amount, recipient information, and location information associated with the resource transfer request, that the resource transfer request is associated with an unauthorized resource transfer; and wherein executing the one or more restrictions on the resource transfer request according to the resource transfer restriction pattern comprises blocking the unauthorized resource transfer from being executed.

In some embodiments, the resource transfer restriction pattern comprises allowing recurring resource transfers to be executed while blocking unauthorized resource transfers from being executed.

In some embodiments, the method further comprises transmitting a notification to the endpoint device, wherein the notification comprises a prompt to confirm whether the resource transfer request is authorized; receiving a response from the endpoint device that the resource transfer request is unauthorized; and based on the response, blocking the resource transfer request.

In some embodiments, the method further comprises transmitting a notification to the endpoint device, wherein the notification comprises a prompt to provide additional authentication credentials.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
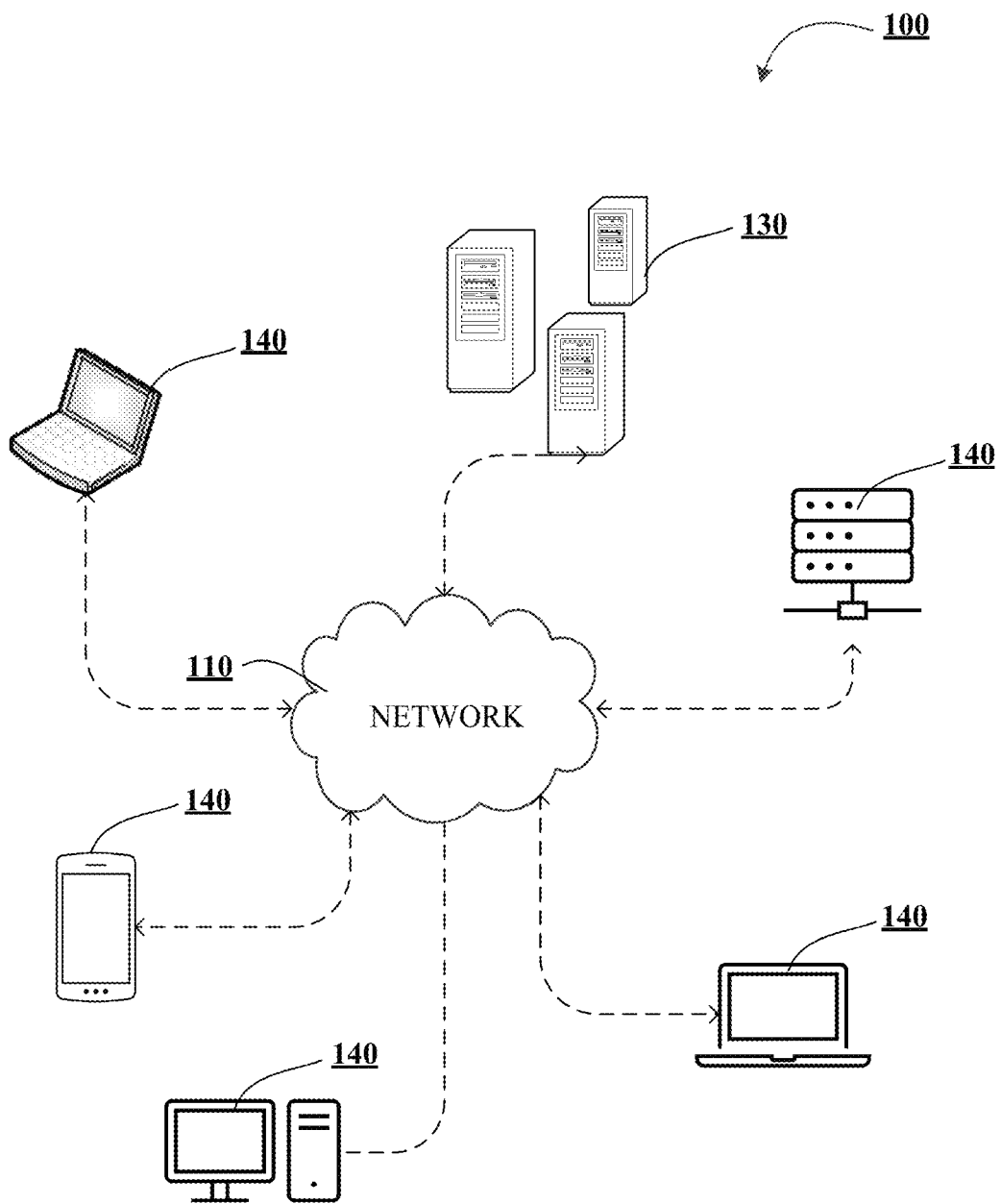
Figure 1B:
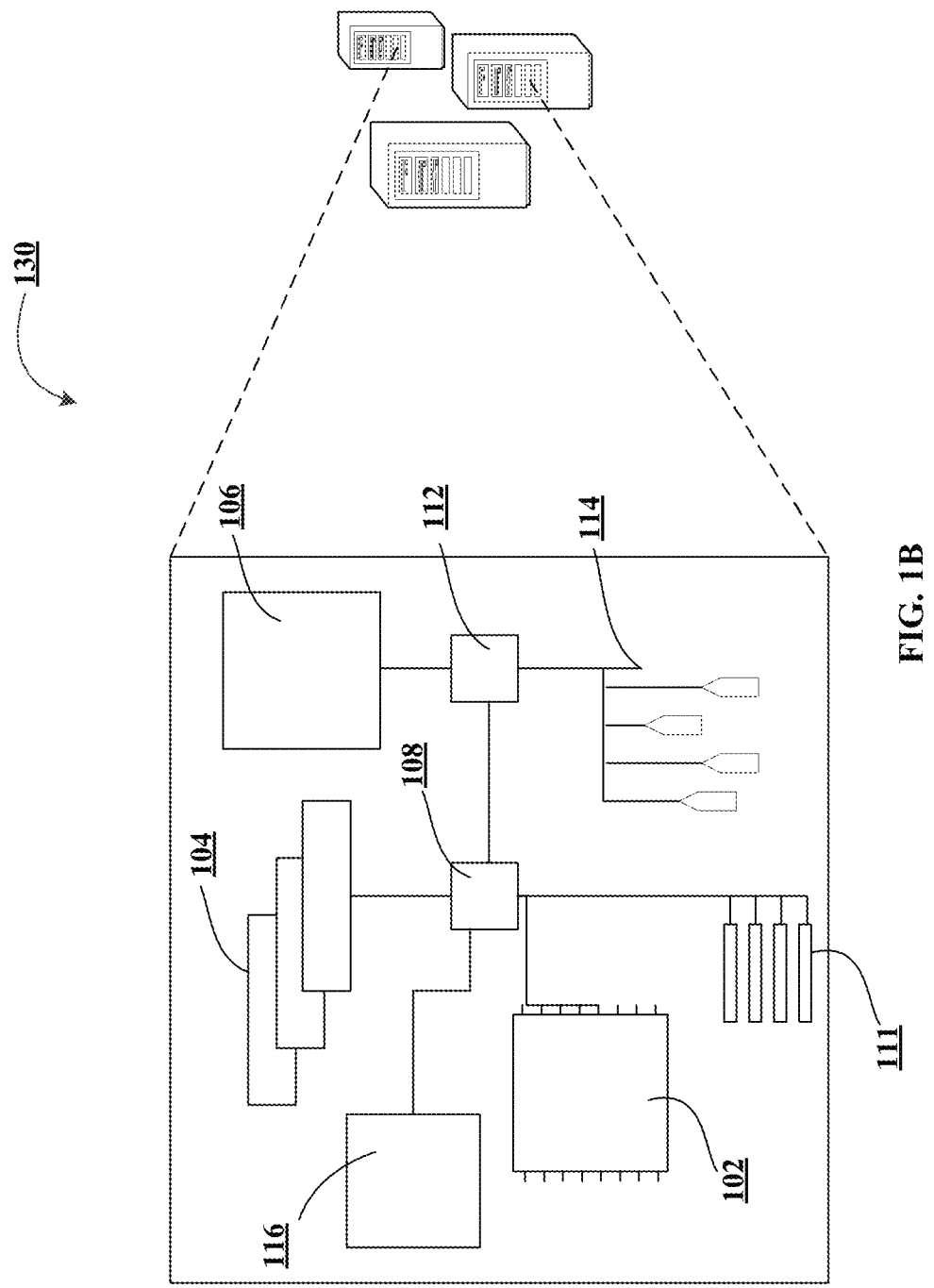
Figure 1C:
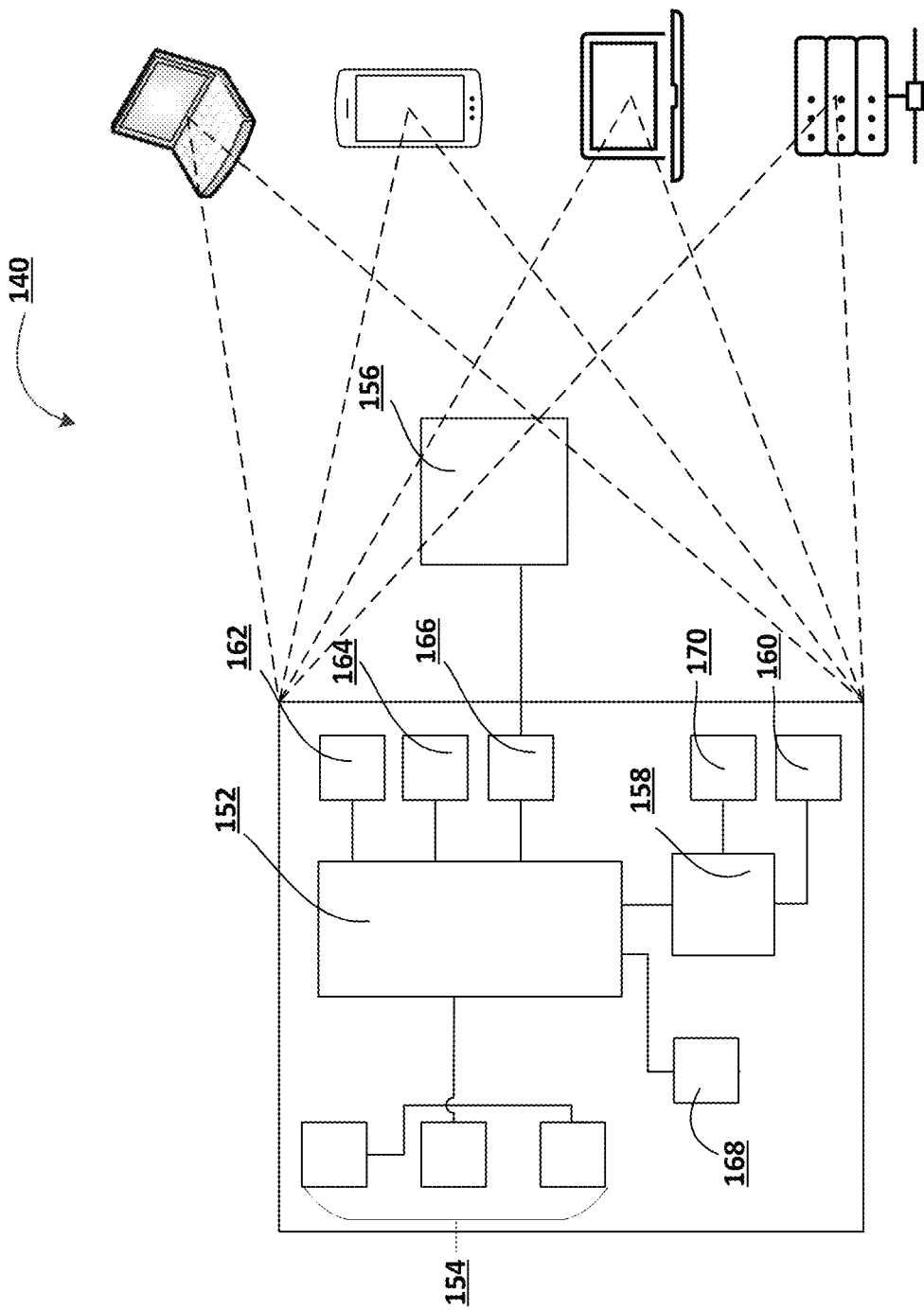
Figure 2:
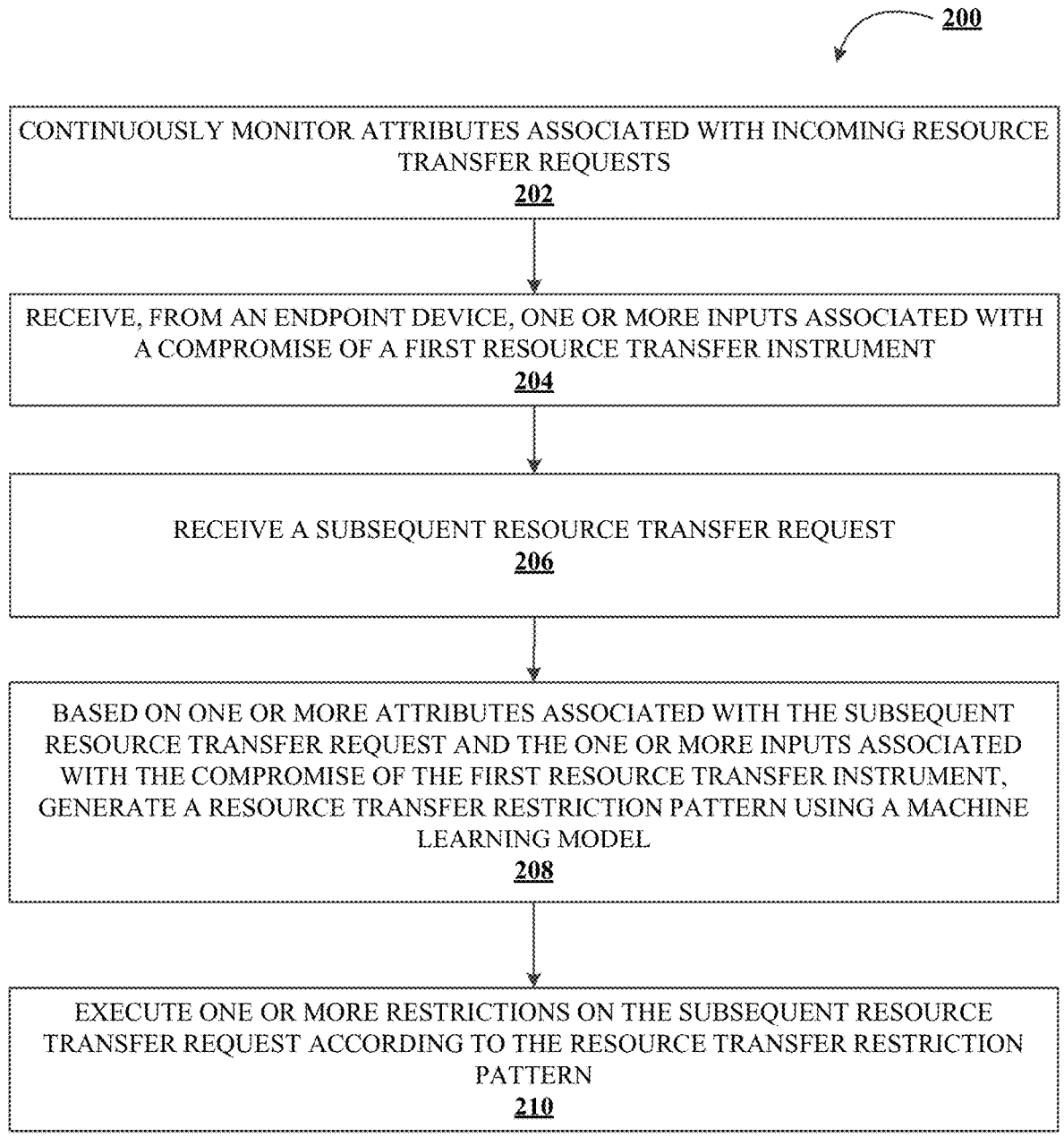

Having thus described embodiments of the invention in general terms, reference will now be made the accompanying drawings, wherein:

FIGS. 1A-1C illustrates technical components of an exemplary distributed computing environment for the system for implementing dynamic authentication restrictions for resource instrument use, in accordance with an embodiment of the present disclosure;

FIG. 2 illustrates a process flow for implementing dynamic authentication restrictions for resource instrument use, in accordance with an embodiment of the present disclosure.

Figure 3:
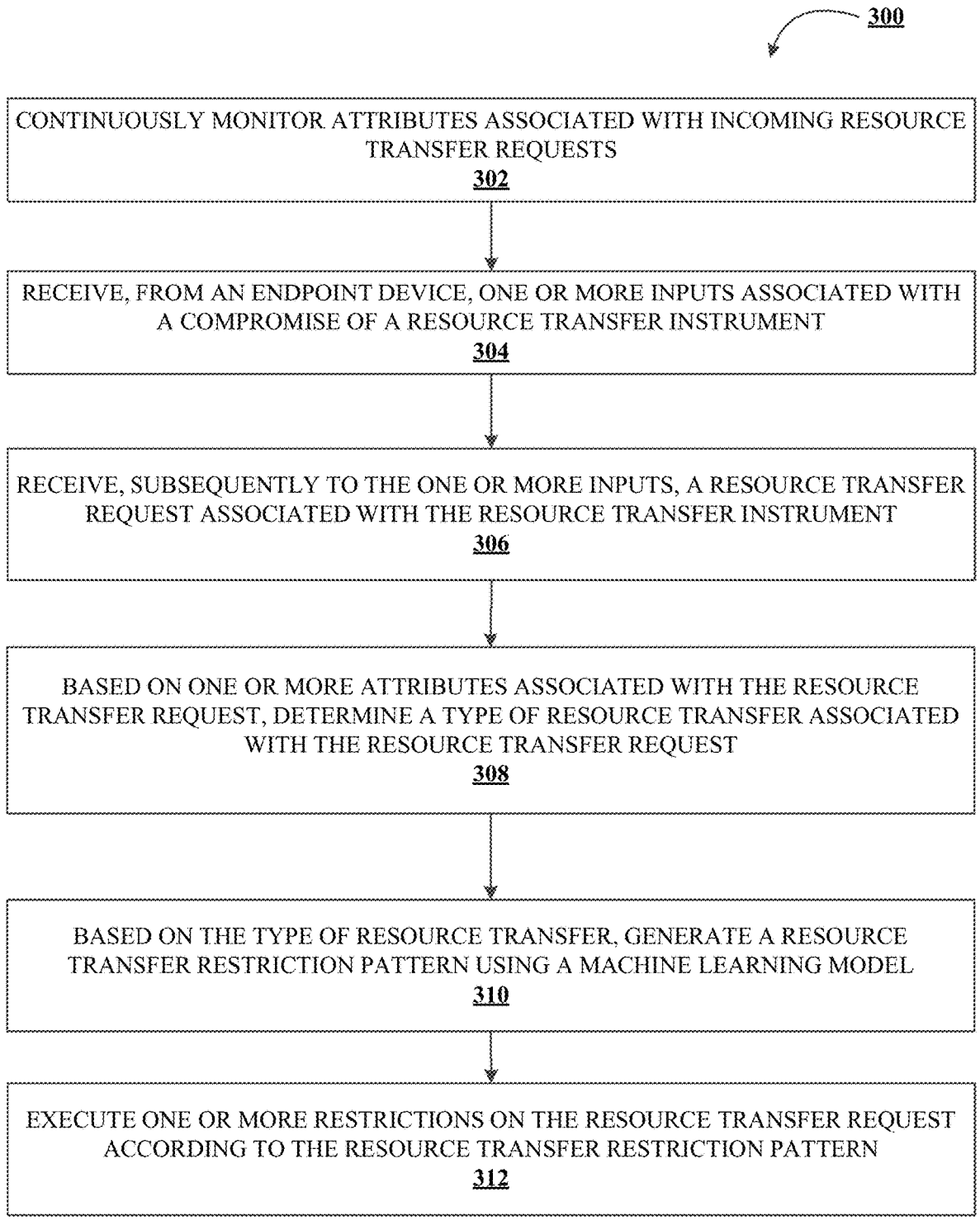

FIG. 3 illustrates a process flow for intelligent type-based implementation of restrictions on resource transfers, in accordance with an embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository—a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "resource instrument" or "resource transfer instrument" may refer to an electronic payment vehicle, such as an electronic credit or debit card. The resource transfer instrument may not be a "card" at all and may instead be account identifying information stored electronically in a user device, such as payment credentials or tokens/aliases associated with a digital wallet, or account identifiers stored by a mobile application.

In the context of resource transfers, users may wish to implement resource transfer restrictions in the event that the user's resource transfer instrument has become compromised or lost. Accordingly, the system may implement a restriction that prevents resource transfers associated with the user and/or user account from being executed until the resource transfer instrument is recovered and/or new authentication credentials are provisioned to the user. That said, the user may wish to implement resource transfer restrictions that offer finer control over the types of restrictions that are implemented. For instance, a user may have multiple resource transfer instruments that allow the user to execute resource transfers, where a first resource transfer instrument may be a physical card (e.g., a debit card) and a second resource transfer instrument may be a secure digital token that may be stored on a mobile terminal associated with the user (e.g., a smartphone of the user). In the event that the user misplaces the first resource transfer instrument, instead of blocking all resource transfers involving the user account from being executed, the user may wish to continue to allow resource transfers to be executed using the second resource transfer instrument. Conversely, the user may wish to allow resource transfers to be executed using the first resource transfer instrument while blocking resource transfer attempts made using the second resource transfer instrument (e.g., in the event that the mobile terminal has been compromised).

In other scenarios, the user may wish to restrict certain resource transfers according to certain attributes or types associated with the resource transfers. For instance, the user may wish to allow or restrict transactions that are associated with certain vendors or certain products or services, are executed for certain purposes, take place at a particular time or on a particular date, are executed in certain geographic areas, or the like. Furthermore, the user may wish to allow preset recurring resource transfers to continue to be executed while restricting net new resource transfers.

To address the foregoing scenarios among others, the system as described herein may provide a way for fine-tuning the restrictions that may be placed on resource transfers involving a user account. In this regard, the system may continuously monitor and analyze one or more attributes of incoming resource transfer requests, where the one or more attributes may include information such as the type of resource transfer instrument (e.g., a card vs. a digital token or the like), the resource transfer amount, the payment platform and/or type of resource transfer (e.g., an online transaction vs. a physical transaction at a physical point-of-sale device), mode of using the resource transfer instrument (e.g., security chip vs. magnetic stripe), resource transfer endpoint (e.g., a particular vendor or service provider), categorization of the resource transfer request (e.g., payment for particular products or services), and the like.

The system may then receive one or more user inputs indicating that a resource transfer instrument of the user has been compromised. In this regard, the one or more user inputs may include information such as the nature of the compromise (e.g., whether the user temporarily misplaced a card vs. whether a confirmed unauthorized user has possession of the card), whether the user is aware of the location of the compromised resource transfer instrument, which type of resource transfer instrument has been compromised (e.g., physical card vs. digital credentials), and the like.

Based on the attributes of the incoming resource transfer request and the user inputs associated with the compromise of the resource transfer instrument, the system may, using a machine learning model, determine whether the incoming resource transfer request should be allowed or restricted. In this regard, the system may compute an impact score associated with the compromise and/or incoming resource transfer request, wherein the impact score reflects a level of exposure associated with the compromise and/or incoming resource transfer request. In this regard, a higher impact score may indicate a high probability of unintended or unauthorized use of the user's account and/or resources, whereas a lower impact score may indicate a relatively low probability of such unintended or unauthorized use. Based on the impact score, the system may apply one or more restrictions along a spectrum of resource transfer restrictions (e.g., ranging from no restrictions to a full block on the execution of resource transfers), where the system may use machine learning to select the most suitable restrictions in view of the impact score.

A number of exemplary embodiments are provided as follows for illustrative purposes. It should be understood that the following examples are not intended to restrict the scope of the disclosure provided herein. In one example, the user inputs may indicate that the user has temporarily misplaced a first resource transfer instrument (e.g., left behind a debit card at a physical point of sale location such as a convenience store). Based on said user input, the system may compute a relatively low impact score associated with the compromise, which may be based on the fact that the user is aware of the location and the nature of the compromise. Accordingly, the system may selectively block additional or new resource transfer requests involving the first resource transfer instrument that are executed outside of the point of sale location and/or involve transfers of resources above a specified threshold, while allowing resource transfer requests involving a second resource transfer instrument (e.g., a secure application on the user's mobile phone).

In another example, the user may indicate that the user has lost a mobile device comprising the second resource transfer instrument in an unknown location. Based on the user input, the system may compute a relatively higher impact score based on the second resource transfer instrument. Accordingly, the system may block all resource transfers from being executed using the second resource transfer instrument while allowing resource transfers to be executed using the first resource transfer instrument.

In yet another example, the user may indicate that an unauthorized user has gained access to the user account and has attempted to execute one or more unauthorized resource transfers. In such an embodiment, the system may compute a high impact score associated with the compromise of the resource transfer instruments and/or user account. Accordingly, the system may implement a full block on resource transfer requests until the resource transfer instruments and/or user accounts are recovered by the user.

In some embodiments, the system may automatically allow certain types of resource transfers to proceed while restricting other types of resource transfers. For instance, the system may detect that a user routinely executes a particular resource transfer every month (e.g., payment of a utility bill) by analyzing the recipient and/or endpoint, resource amount, transfer date and/or time, and other information associated with the recurring resource transfer. Upon detecting the recurring resource transfer, the system may allow the recurring resource transfer to be executed while blocking "net new" resource transfers from being executed. In other embodiments, the system may allow resource transfers relating to certain categories (e.g., food purchases) while blocking resource transfers relating to other categories (e.g., luxury goods).

The present disclosure provides a technical solution to the technical problem of non-granular control over the restriction of resource transfers. Specifically, the technical solution presented herein provides a way to intelligently and dynamically implement resource transfer restrictions, which is an improvement over existing, conventional technologies in the resource transfer space, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment 100 for the system for implementing dynamic authentication restrictions for resource instrument use, in accordance with an embodiment of the invention. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions.

The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for implementing dynamic authentication restrictions for resource instrument use, in accordance with an embodiment of the present disclosure. The process begins at block 202, where the system continuously monitors attributes associated with incoming resource transfer requests. In this regard, the system may analyze the information associated with the various resource transfer requests, where the attributes of the resource transfer requests may include resource transfer amounts, recipient information, endpoint or transaction processors, categorization of products or services, resource transfer instrument information, transfer dates and/or times, and the like. Based on the attributes, the system may generate training data used to train the machine learning models, which in turn may be configured to allow or restrict incoming resource transfer requests based at least partially on the attributes of the resource transfer requests.

The process continues to block 204, where the system receives, from an endpoint device, one or more inputs associated with a compromise of a first resource transfer instrument. The compromise of the first resource transfer instrument may be, for instance, misplacement of the first resource transfer instrument (e.g., the user left behind a debit card in a taxi). In other embodiments, the compromise of the first resource transfer instrument may be possession and/or attempted use of the first resource transfer instrument by an unauthorized party. In yet other embodiments, such as when the first resource transfer instrument is a digital token, the compromise may be an unauthorized use of user authentication credentials by an unauthorized third party. Accordingly, the one or more inputs provided by the endpoint device may further include information regarding the compromise, such as whether the location of the first resource transfer instrument is known, whether the first resource transfer instrument has been possessed or used by an unauthorized third party, the time and/or date on which the user has noticed the first resource transfer instrument was missing, the last time or location in which the first resource transfer instrument was used, and the like. In some embodiments, the system may be configured to guide the user through the resource transfer restriction process by transmitting one or more queries to the user (e.g., "where did you lose the card?" or "what was the last transaction you made using the card?") and receiving one or more responses to the queries from the user. Based on the responses, the system may extract the information regarding the compromise and use said information to drive its decisioning processes.

The process continues to block 206, where the system receives a subsequent resource transfer request. The subsequent resource transfer request may be associated with the user's account. Accordingly, in some embodiments, the subsequent resource transfer request may be associated with the first resource transfer instrument (e.g., a physical card). In other embodiments, the subsequent resource transfer request may be associated with a second resource transfer instrument (e.g., user authentication credentials or a digital token). In yet other embodiments, the subsequent resource transfer request may not be associated with either the first resource transfer instrument or the second resource transfer instrument (e.g., a recurring invoice based directly on the user's account information).

The process continues to block 208, where the system, based on one or more attributes associated with the subsequent resource transfer request and the one or more inputs associated with the compromise of the first resource transfer instrument, generate a resource transfer restriction pattern using a machine learning model. In this regard, the resource transfer restriction pattern may take into account the natures of the resource transfer request and the circumstances of the compromise of the first resource transfer instrument. Based on the foregoing, the system may compute an impact score associated with the execution of the subsequent resource transfer request. The impact score may be incremented based on, for instance, detecting that the subsequent resource transfer request is associated with the first resource transfer instrument (the same resource transfer instrument that has been compromised), is for a resource transfer amount above a defined threshold, involves certain endpoints or recipients, utilizes certain payment platforms, involves particular categories of products or services (e.g., gift cards), or the like. If the impact score is incremented above a defined threshold, the system may categorize the subsequent resource transfer request as having a high impact on the user account and thus block the resource transfer from being executed. On the other hand, if the impact score falls below the threshold, the system may permit certain resource transfers involving the user account to be executed while restricting others. In this way, the system may intelligently generate a resource transfer restriction pattern that balances the security of the user account against the convenience and usability of resource transfers involving the user account.

The process concludes at block 210, where the system executes one or more restrictions on the subsequent resource transfer request according to the resource transfer restriction pattern. Accordingly, in some embodiments, executing the one or more restrictions according to the resource transfer restriction pattern may comprise detecting that the subsequent resource transfer request is associated with the first resource transfer instrument (e.g., the subsequent resource transfer request was a physical point-of-sale transaction using the user's debit card) and automatically blocking the subsequent resource transfer request from being executed. On the other hand, the resource transfer restriction pattern may comprise detecting that the subsequent resource transfer request is not associated with the first resource transfer instrument (e.g., the subsequent resource transfer request is a transaction initiated by the user through the user's mobile phone, a transaction that has been previously scheduled or is a recurring transaction, or the like). In such embodiments, executing the one or more restrictions may comprise allowing the subsequent resource transfer request to be executed.

FIG. 3 illustrates a process flow 300 for intelligent type-based implementation of restrictions on resource transfers, in accordance with an embodiment of the present disclosure. The process begins at block 302, where the system continuously monitors attributes associated with incoming resource transfer requests. In addition to the attributes described above, the system may further analyze the attributes to determine whether the resource transfers are new transactions or expected transactions. In this regard, the system may analyze attributes such as resource transfer amounts, transfer time and dates, and recipient information to detect a recurring pattern of resource transfers. For instance, the system may detect that the user executes a transfer of a fixed amount or similar amount of resources to a specific company on the first day of every month (e.g., the user pays an electric bill). Based on detecting that the transfer pattern, the system may determine that the transfer is a recurring resource transfer.

The process continues to block 304, where the system receives, from an endpoint device, one or more inputs associated with a compromise of a resource transfer instrument. As described above, the user may provide the inputs indicating that the resource transfer instrument has been compromised. In other embodiments, the system may automatically detect that the resource transfer instrument and/or the user account has been compromised based on analyzing the attributes of the incoming resource transfer requests and detecting a potentially unauthorized resource transfer request. For instance, if the attributes of the resource transfer request indicate that the resource transfer is for an unusually large amount of resources, involves new recipients, are sent from a previously unknown or unusual geographic location, or the like, the system may determine that the resource transfer request is potentially unauthorized.

The process continues to block 306, where the system receives, subsequently to the one or more inputs, a resource transfer request associated with the resource transfer instrument. As described above, the resource transfer request may be associated with the resource transfer instrument (e.g., the resource transfer request has been made using the resource transfer instrument).

The process continues to block 308, where the system, based on one or more attributes associated with the resource transfer request, determines a type of resource transfer associated with the resource transfer request. In particular, the system may detect, based on the attributes of the resource transfer request, that the type of resource transfer is a recurring resource transfer (e.g., payment of a bill). In other embodiments, the system may detect that the resource transfer is not a recurring resource transfer but is an expected resource transfer (e.g., the resource transfer involves a recipient with which the user has transferred resources to in the past, the resource transfer amount falls below a certain threshold, the resource transfer was executed using an expected resource transfer instrument, or the like). For example, the system may detect, based on historical resource transfer information, that the user frequently makes small transactions at a particular vendor (e.g., a gas station) using a mobile payment application. Accordingly, the system may determine that a subsequent resource transfer request involving the particular vendor, particular resource transfer instrument, and transfer amounts is an expected resource transfer. In yet other embodiments, the system may detect that the resource transfer type is neither a recurring or expected resource transfer. In such embodiments, the system may determine that the resource transfer type is an unrecognized or unauthorized resource transfer (e.g., by detecting a new recipient, resource amount over a defined threshold, unusual geographic location of the transfer, and the like).

The process continues to block 310, where the system, based on the type of resource transfer, generates a resource transfer restriction pattern using a machine learning model. The resource restriction pattern may comprise a scheme for allowing recurring resource transfers and/or expected resource transfers while restricting or blocking unrecognized or unauthorized resource transfers. To continue the above example, while the resource transfer instrument remains compromised, the system may allow recurring transactions (e.g., bill payments) and expected transactions (e.g., routine transactions, such as payments for gas) while restricting a transaction attempted in another state for a large purchase at a new store or vendor.

The process continues to block 312, where the system executes one or more restrictions on the resource transfer request according to the resource transfer restriction pattern. In some embodiments, executing the one or more restrictions may comprise blocking the resource transfer request from being executed. In other embodiments, executing the one or more restrictions may comprise prompting the sender of the resource transfer request for additional authentication credentials and/or inputs. For instance, the system may transmit a notification to the endpoint device associated with the user account, where the notification comprises a prompt to confirm whether the resource transfer request was genuine. In such cases, the user may transmit a response indicating that the resource transfer request was not genuine, which may cause the resource transfer request to be blocked. In this way, the system may identify the expected or authorized transactions from the potentially unauthorized transactions and automatically apply an intelligent restriction scheme to improve the security and user experience associated with performing resource transfers with the user account.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for implementing dynamic authentication restrictions for resource instrument use, the system comprising:
    at least one non-transitory storage device; and
    at least one processor coupled to the at least one non-transitory storage device, wherein the at least one processor is configured to:
        continuously monitor attributes associated with incoming resource transfer requests;
        receive, from an endpoint device, one or more inputs associated with a compromise of a first resource transfer instrument;
        receive a subsequent resource transfer request;
        based on one or more attributes associated with the subsequent resource transfer request and the one or more inputs associated with the compromise of the first resource transfer instrument, generate a resource transfer restriction pattern using a machine learning model; and
        execute one or more restrictions on the subsequent resource transfer request according to the resource transfer restriction pattern while allowing recurring and expected resource transfers to process, wherein executing one or more restrictions on the subsequent resource transfer request further comprises prompting a request for additional authentication credentials and inputs from a device associated with the subsequent resource transfer request.

2. The system of claim 1, wherein the at least one processor is further configured to detect that the subsequent resource transfer request is associated with the first resource transfer instrument, wherein executing the one or more restrictions according to the resource transfer restriction pattern comprises blocking the subsequent resource transfer request while allowing resource transfer requests associated with a second resource transfer instrument.

3. The system of claim 1, wherein the at least one processor is further configured to detect that the subsequent resource transfer request is associated with a second resource transfer instrument, wherein executing the one or more restrictions according to the resource transfer restriction pattern comprises allowing the subsequent resource transfer request.

4. The system of claim 1, wherein continuously monitoring the attributes associated with incoming resource transfer requests comprises monitoring at least one of resource transfer amounts, endpoint information, and resource transfer times.

5. The system of claim 1, wherein the one or more inputs from the endpoint device comprise an indication that the first resource transfer instrument has been misplaced, wherein the one or more inputs further comprise a location of the first resource transfer instrument.

6. The system of claim 1, wherein the at least one processor is further configured to transmit one or more queries to the endpoint device associated with the one or more inputs associated with the compromise of the first resource transfer instrument.

7. The system of claim 1, wherein the one or more inputs from the endpoint device indicates that the first resource transfer instrument has been used by an unauthorized user.

8. A computer program product for implementing dynamic authentication restrictions for resource instrument use, the computer program product comprising a non-transitory computer-readable medium comprising code causing an apparatus to:
    continuously monitor attributes associated with incoming resource transfer requests;
    receive, from an endpoint device, one or more inputs associated with a compromise of a first resource transfer instrument;
    receive a subsequent resource transfer request;
    based on one or more attributes associated with the subsequent resource transfer request and the one or more inputs associated with the compromise of the first resource transfer instrument, generate a resource transfer restriction pattern using a machine learning model; and
    execute one or more restrictions on the subsequent resource transfer request according to the resource transfer restriction pattern while allowing recurring and expected resource transfers to process, wherein executing one or more restrictions on the subsequent resource transfer request further comprises prompting a request for additional authentication credentials and inputs from a device associated with the subsequent resource transfer request.

9. The computer program product of claim 8, wherein the apparatus is further configured to detect that the subsequent resource transfer request is associated with the first resource transfer instrument, wherein executing the one or more restrictions according to the resource transfer restriction pattern comprises blocking the subsequent resource transfer request while allowing resource transfer requests associated with a second resource transfer instrument.

10. The computer program product of claim 8, wherein the apparatus is further configured to detect that the subsequent resource transfer request is associated with a second resource transfer instrument, wherein executing the one or more restrictions according to the resource transfer restriction pattern comprises allowing the subsequent resource transfer request.

11. The computer program product of claim 8, wherein continuously monitoring the attributes associated with incoming resource transfer requests comprises monitoring at least one of resource transfer amounts, endpoint information, and resource transfer times.

12. The computer program product of claim 8, wherein the one or more inputs from the endpoint device comprise an indication that the first resource transfer instrument has been misplaced, wherein the one or more inputs further comprise a location of the first resource transfer instrument.

13. The computer program product of claim 8, wherein the apparatus is further configured to transmit one or more queries to the endpoint device associated with the one or more inputs associated with the compromise of the first resource transfer instrument.

14. A method for implementing dynamic authentication restrictions for resource instrument use, the method comprising:
   continuously monitoring attributes associated with incoming resource transfer requests;
   receiving, from an endpoint device, one or more inputs associated with a compromise of a first resource transfer instrument;
   receiving a subsequent resource transfer request;
   based on one or more attributes associated with the subsequent resource transfer request and the one or more inputs associated with the compromise of the first resource transfer instrument, generating a resource transfer restriction pattern using a machine learning model; and
   executing one or more restrictions on the subsequent resource transfer request according to the resource transfer restriction pattern while allowing recurring and expected resource transfers to process, wherein executing one or more restrictions on the subsequent resource transfer request further comprises prompting a request for additional authentication credentials and inputs from a device associated with the subsequent resource transfer request.

15. The method of claim 14, wherein the method further comprises detecting that the subsequent resource transfer request is associated with the first resource transfer instrument, wherein executing the one or more restrictions according to the resource transfer restriction pattern comprises blocking the subsequent resource transfer request while allowing resource transfer requests associated with a second resource transfer instrument.

16. The method of claim 14, wherein the method further comprises detecting that the subsequent resource transfer request is associated with a second resource transfer instrument, wherein executing the one or more restrictions according to the resource transfer restriction pattern comprises allowing the subsequent resource transfer request.

17. The method of claim 14, wherein continuously monitoring the attributes associated with incoming resource transfer requests comprises monitoring at least one of resource transfer amounts, endpoint information, and resource transfer times.

18. The method of claim 14, wherein the one or more inputs from the endpoint device comprise an indication that the first resource transfer instrument has been misplaced, wherein the one or more inputs further comprise a location of the first resource transfer instrument.

19. The method of claim 14, wherein the method further comprises transmitting one or more queries to the endpoint device associated with the one or more inputs associated with the compromise of the first resource transfer instrument.

20. The method of claim 14, wherein the one or more inputs from the endpoint device indicates that the first resource transfer instrument has been used by an unauthorized user.

* * * * *